United States Patent
Mundry et al.

(10) Patent No.: US 7,040,174 B2
(45) Date of Patent: May 9, 2006

(54) PRESSURE CELL DEVICE FOR MEASURING HYDRAULIC PRESSURES

(75) Inventors: Sebastian M. Mundry, Lüdinghausen (DE); Jens Titschert, Lünen (DE); Reiner Frank, Gevelsberg (DE); Jürgen Tschöpe, Selm (DE)

(73) Assignee: DBT Automation GmbH, Lunen (DE)

( * ) Notice: Subject to any disclaimer, the term of this patent is extended or adjusted under 35 U.S.C. 154(b) by 62 days.

(21) Appl. No.: 10/738,513

(22) Filed: Dec. 17, 2003

(65) Prior Publication Data
US 2004/0129085 A1    Jul. 8, 2004

(30) Foreign Application Priority Data
Dec. 18, 2002 (DE) .......................... 202 19 732 U

(51) Int. Cl.
*G01L 9/02* (2006.01)
(52) U.S. Cl. ...................................................... 73/723
(58) Field of Classification Search ........... 73/700–756
See application file for complete search history.

(56) References Cited

U.S. PATENT DOCUMENTS

| | | | | |
|---|---|---|---|---|
| 4,888,662 A | * | 12/1989 | Bishop | ......................... 73/724 |
| 4,934,193 A | * | 6/1990 | Hayata | .......................... 73/727 |
| 5,535,629 A | * | 7/1996 | Gerdes et al. | ................. 73/756 |
| 5,665,921 A | * | 9/1997 | Gerst et al. | .................... 73/715 |
| 6,561,037 B1 | * | 5/2003 | Bohler et al. | .................. 73/715 |
| 6,612,177 B1 | * | 9/2003 | Boehler et al. | ............... 73/715 |
| 6,871,546 B1 | * | 3/2005 | Scheurich et al. | ............. 73/754 |

FOREIGN PATENT DOCUMENTS

| | | |
|---|---|---|
| DE | 3937573 A1 | 5/1991 |
| DE | 29615134 | 12/1996 |

* cited by examiner

*Primary Examiner*—Max Noori
(74) *Attorney, Agent, or Firm*—Fay, Sharpe, Fagan, Minnich & McKee, LLP

(57) ABSTRACT

The pressure cell device according to the invention serves for measuring hydraulic pressures in hydraulic mining devices in an inherently secure service region. It is provided with a connection element which can be connected to a pressure reception connection and with a sensor housing, on the inside of which is arranged a hydroelectric pressure transducer which is pressurised by the hydraulic pressure present at the pressure reception connection and converts this into an electrical signal. So as to ensure high measurement accuracy over a long operating period, without it being necessary to have exchanges of the pressure transducer or its new calibration, it is provided according to the invention that the pressure transducer comprises a ceramic pressure measuring cell.

12 Claims, 1 Drawing Sheet

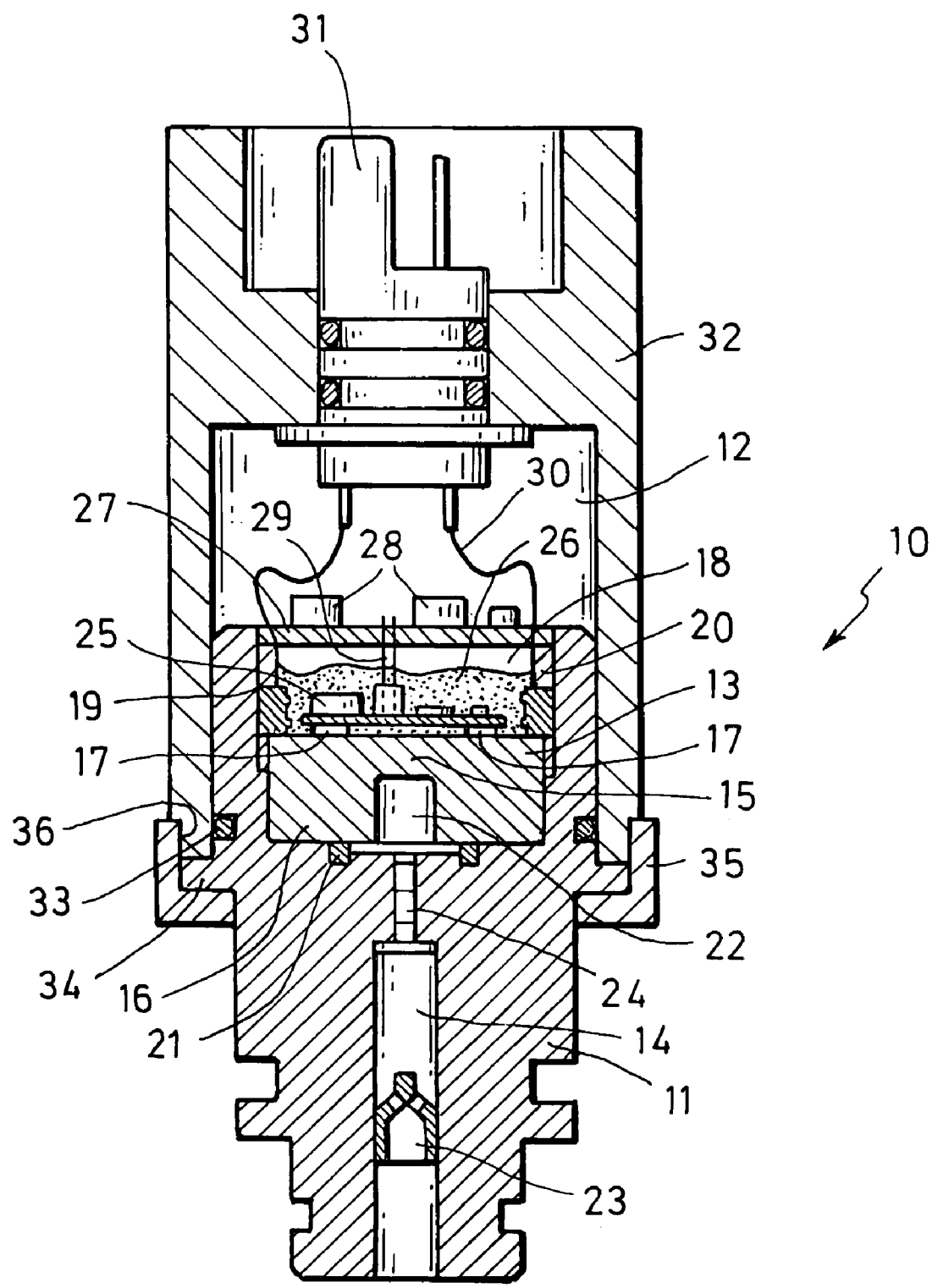

PRESSURE CELL DEVICE FOR MEASURING HYDRAULIC PRESSURES

FIELD OF THE INVENTION

The invention relates to a pressure cell device for measuring hydraulic pressures, with a connection element which can be connected to a pressure reception connector, and a sensor housing, on the inside of which is arranged a hydroelectric pressure transducer which is pressurized by hydraulic pressure at the pressure reception connector and which converts this into an electrical signal. The pressure cell device according to the invention is particularly formed for use in hydraulic mining devices in the intrinsically save range of capacity and is thereby preferably formed for the use in water or oil hydraulic devices.

BACKGROUND OF THE INVENTION

Pressure cell devices of this type are used in mining for determining the pressures of hydraulic mining devices as for example support cylinders at self-advancing support frames or other hydraulic systems and drives, as can often be encountered underground. With the help of the pressure cell devices it is possible to deliver the determined pressure values for example to a remotely located control center for remote display.

Pressure cell devices of the typical kind are for example known from DE 3937573 A1 or DE 29615134 U. In these known pressure cell devices, a metal membrane with a strain gauge arrangement is used as pressure transducer. This embodiment has the disadvantage that the calibration of the pressure transducer can comparatively quickly get lost, in particular with high pressures to be measured and with temperature variations of the surrounding temperatures, as the metal membrane itself reacts with form and/or position changes when pressure peaks or temperature variations occur, whereby it can come to a falsification of the measuring results delivered by the strain gauge arrangement up to a drifting of the measuring signal. This results in that, with the known pressure cell devices, the pressure transducer has to be exchanged relatively often or calibrated again elaborately.

SUMMARY OF THE INVENTION

It is the object of the invention to avoid these disadvantages and to create a pressure cell device which ensures a high measuring accuracy over a long operating period without exchanges of the pressure transducer or its new calibration being necessary.

This object is solved with the invention in that the pressure transducer comprises a ceramic pressure element.

The use of a ceramic pressure element has the advantage that it, if at all, only reacts in a small degree to temperature fluctuations and also not with permanent deformations to large pressure peaks. Furthermore, during the use of the ceramic pressure element according to the invention, it does regularly not result in drifting of the measuring signal. Thus, a single calibration of the sensor before its first operation is sufficient to ensure a long operating period with a high measuring accuracy.

The ceramic pressure element preferably essentially consists of a ceramic body with at least one strain gauge element arranged thereon. The ceramic body is conveniently fixed in the sensor housing in a detachable manner, so that it can easily be taken out and mounted again if necessary. For this, it has proved to be advantageous, if the sensor housing is formed in several parts and comprises two housing parts which can be screwed to one another, between which the ceramic body or the connection element receiving it is held in a clamped manner.

It is possible to arrange the ceramic body in such a manner that it is received in a reception opening in the sensor housing or in the part of the connection element projecting into sensor housing. Thereby, it is particularly advantageous if the ceramic body is secured in the reception opening by means of a screw ring. So as to take into account the adverse surrounding conditions, as they are generally present underground, it is advantageous if the ceramic body is cast into the reception opening by means of a curing casting mass.

A (highly integrated) amplifier circuit and/or a pre-circuit electronics can be arranged in the sensor housing. The pre-circuit electronics has thereby the particular object to supply the highly integrated amplifier circuit with a constant voltage and to ensure the inherent security of the entire circuit. The amplifier circuit and/or the pre-circuit electronics are conveniently cast together with the ceramic body in the sensor housing or in the part of the connection element projecting into the sensor housing.

In an essentially known manner, the sensor housing can be provided with an electrical plug connection accessible from the outside which is connected to the at least one strain gauge element or the amplifier circuit connected thereto. A particularly advantageous embodiment of the invention is achieved if a communication interface of the amplifier electronics is arranged in the sensor housing which can be accessed from the outside. By this, it becomes possible to assign further functions to the amplifier electronics. For example, the measuring region of the sensor can digitally again be adjusted by the communication interface, which can be a BUS, which is accessible from the outside of the pressure cell device.

The ceramic body is preferably sealed with regard to the connection element by means of at least one O-ring or the like, so that moisture and dirt cannot reach the sensitive measuring elements. An embodiment in which the connection element comprises a cylinder opening which is pressurised by pressure fluid is particularly advantageous, in which a media retention system is received in a displaceable manner, for example screwed into the cylinder opening. Should, for example, during the operation of the pressure cell device, the ceramic measuring element burst when a maximum pressure in the system is exceeded, the pressure fluid which then suddenly streams through the cylinder opening breaks away a plug element of the media retention system which then tightly seals the cylinder bore at a constriction part provided therefore and effectively prevents a further inflow of the pressure fluid into the interior of the pressure cell device.

BRIEF DESCRIPTION OF THE DRAWING

Further characteristics and advantages of the invention result from the following description and the drawing, in which a preferred embodiment of the invention is explained in further detail with an example. The FIGURE shows a pressure cell device according to the invention in a longitudinal section.

DETAILED DESCRIPTION OF THE INVENTION

In the drawing, 10 designates a pressure cell device in its entirety, as is used for measuring hydraulic pressures at hydraulic mining systems underground in an intrinsically safe, electrical service system. The pressure cell device 10 comprises a connection element 11 and a sensor housing 12 which can be connected to a pressure reception connection (not shown) of a hydraulic cylinder or the like, on the inside of which housing is arranged a hydroelectric pressure transducer 13. The pressure transducer is pressurized by the hydraulic pressure present at the pressure reception connection by a pressure channel 14 which extends longitudinally through the connection element 11, and converts the pressure values into electrical measuring signals which can be fed to a control device, a remotely located measuring control room or a remote display.

According to the invention, the pressure transducer 13 comprises a ceramic pressure element 15, which essentially consists of an approximately circular ceramic body 16 with several strain gauge strips 17 which are arranged at it, which are mounted on the ceramic body 16 in a suitable manner. For locating the ceramic body 16 in position in the sensor housing 12, the connection element 11 is provided with a sack-hole like unscrewing device 18, the diameter of which in the base region corresponds to the outer diameter of the ceramic body. The ceramic body 16 with the strain gauge strips 17 secured thereto is inserted into this unscrewing device; a thread 19 arranged in the upper region of the unscrewing device and a retaining ring 20 which is screwed into it, which is screwed up to the attachment with the upper side of the ceramic body 16, ensure that the ceramic body is secured axially in the unscrewing device 18 and cannot fall out and that the pressure forces of the medium are absorbed.

The ceramic body is sealed with regard to the pressure channel 14 with an O- or R-ring 21 of rubber or another elastic material. Thereby it is ensured that liquid which is present in the channel 14 cannot go laterally past between this and the wall of the unscrewing device and flow further into the interior of the sensor housing, but can only access the central measuring chamber 22 of the ceramic body. A media retention element 23, which is received in the pressure channel in an axially displaceable manner and which is secured therein by screwing (not shown), prevents that, in the case of a failure of the ceramic measuring cell, pressure fluid can enter the interior of the pressure cell device and exit from this to the surroundings. If a bursting of the ceramic measuring cell results, pressure fluid suddenly flows with a high velocity and with a high pressure through the pressure channel and thereby breaks away the front tip of the media retention means. The torn tip is entrained by the flowing pressure fluid up to a narrower section 24 of the pressure channel, which it then closes permanently in a nozzle needle-like manner, so that pressure fluid cannot reach the inside of the pressure cell device anymore and accordingly cannot exit therefrom.

As can easily be seen from the drawing, on the upper side of the ceramic body next to the strain gauge strip 17, there is secured a measuring amplifier circuit 25 with suitable means, not shown in detail. For the protection from moisture and dirt and for the increase of the mechanical load capacity, the pressure transducer is cast in the unscrewing device 18 together with the amplifier circuit mounted thereto with a suitable casting means 26, for example synthetic resin.

Above the cast 26 and the thread 19 of the of the unscrewing device is inserted a blank 27 having a pre-circuit electronics 28 which is connected to the pressure measuring cell or its amplifier circuit by several contact pins 29. From of the pre-circuit electronics, several connection leads 30 lead to a plug connection 31 which is arranged at the backward (top) end of the pressure cell device 10, accessible from the outside, to which can be connected a usual electrical connection cable (not shown).

So as to keep the parts present in the interior of the sensor housing accessible, the sensor housing 12 is formed in several parts with a backward plug cap 32 comprising the electrical plug part, which cap is attached from behind up to the attachment with a stop collar 34, and with a cap nut 35, which is attached from the front over the connection element 11 and which is screwed on an outer thread 36 at the plug cap 32 by clamping of the stop collar 32. An O-ring seal 33 is provided between the connection element 11 and the plug cap 32.

By the use of a ceramic body as the carrier element for the strain gauge strips, it is avoided in a particularly effective manner that temperature fluctuations in the surrounding temperature of the sensor according to the invention affect the measuring result of the pressure measurements in a falsifying manner. There also do not result any errors due to remaining material deformations at the pressure measuring cell, which can be ascribed to the particularly advantageous material choice with ceramic carrier bodies, partially also to the media retention piston which effectively prevents inadmissibly high pressure peaks in the system.

In an advantageous development, the pressure cell device can also be provided with a communication interface which is accessible from the outside of the cell element and connected to the pre-circuit electronics, for example a digital interface, so that it is possible to program the adjusted parameters of the pre-circuit electronics without opening the sensor housing.

The invention claimed is:

1. Pressure cell device for measuring hydraulic pressures, with a connection element which can be connected to a pressure reception connector, and with a sensor housing on the inside of which is connected a hydroelectric pressure transducer, said pressure transducer being pressurized by hydraulic pressure at said pressure reception connector and converting said hydraulic pressure into an electrical pressure signal, wherein said pressure transducer comprises a ceramic pressure measuring cell which comprises a ceramic body with at least one strain gauge element, said at least one strain gauge element being arranged on said ceramic body, wherein said ceramic body is received in a reception opening in said sensor housing or in a part of said connecting element projecting into said sensor housing, and wherein said ceramic body is cast in said reception opening by means of a curing casting mass.

2. Pressure cell device according to claim 1, wherein it is formed for the use in hydraulic mining devices in the intrinsically safe service region.

3. Pressure cell device according to claim 1, wherein it is formed for the use in water or oil-hydraulic devices.

4. Pressure cell device according to claim 1, wherein at least one of: (i) an amplifier circuit (25); and (ii) pre-circuit electronics is arranged in said sensor housing.

5. Pressure cell device according to claim 1, wherein said ceramic body is clamped detachably in said sensor housing.

6. Pressure cell device according to claim 5, wherein said sensor housing is formed in several parts and comprises two housing parts between which said ceramic body or said connecting element receiving said ceramic body is mounted in a clamped manner.

7. Pressure cell device according to claim 1, further comprising an amplifier circuit secured to the ceramic body, wherein said amplifier circuit and said ceramic body are both cast in said casting mass.

8. Pressure cell device according to claim 1, wherein said ceramic body is fixed into said reception opening by means of a securing element.

9. Pressure cell device according to claim 1, wherein said sensor housing is provided with a plug-in connection, said plug-in connection being accessible from its outside and being connected to said at least one strain gauge element or said amplifier circuit or said pre-circuit electronics connected thereto.

10. Pressure cell device according to claim 4, wherein both said amplifier circuit and said pre-circuit electronics are located in said sensor housing, said pressure cell device further comprising a communication interface for said pre-circuit electronics, said communication interface accessible from outside the sensor housing.

11. Pressure cell device according to claim 1, wherein said ceramic body is sealed off with regard to said connecting element by means of at least one O-ring or the like.

12. Pressure cell device according to claim 1, wherein said connecting element comprises a cylinder opening pressurized with pressure fluid, said pressure cell device further comprising a media retention system located in said cylinder opening.

* * * * *

UNITED STATES PATENT AND TRADEMARK OFFICE
CERTIFICATE OF CORRECTION

PATENT NO. : 7,040,174 B2
APPLICATION NO. : 10/738513
DATED : May 09, 2006
INVENTOR(S) : Sebastian M. Mundry et al.

It is certified that error appears in the above-identified patent and that said Letters Patent is hereby corrected as shown below:

On Title Page, Item (73) col. 1 should read,
(73) Assignee: BDT Gmbh, Lunen (DE)

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 7,040,174 B2  
APPLICATION NO.  : 10/738513  
DATED              : May 9, 2006  
INVENTOR(S)        : Sebastian M. Mundry et al.

Page 1 of 1

It is certified that error appears in the above-identified patent and that said Letters Patent is hereby corrected as shown below:

On Title Page, should read  
(73)    Assignee:   DBT GmbH, Lunen  (DE)

Signed and Sealed this

Twenty-third Day of January, 2007

JON W. DUDAS  
*Director of the United States Patent and Trademark Office*